(12) United States Patent
Aoyama et al.

(10) Patent No.: US 11,321,699 B2
(45) Date of Patent: May 3, 2022

(54) PAYMENT SUPPORT SYSTEM, PAYMENT SUPPORT METHOD, AND NON-TRANSITORY RECORDING MEDIUM

(71) Applicant: GURUNAVI, Inc., Tokyo (JP)

(72) Inventors: Shoki Aoyama, Tokyo (JP); Hiroki Ono, Tokyo (JP)

(73) Assignee: GURUNAVI, INC., Tokyo (JP)

( * ) Notice: Subject to any disclaimer, the term of this patent is extended or adjusted under 35 U.S.C. 154(b) by 7 days.

(21) Appl. No.: 16/844,367

(22) Filed: Apr. 9, 2020

(65) Prior Publication Data

US 2020/0327530 A1  Oct. 15, 2020

(30) Foreign Application Priority Data

Apr. 15, 2019  (JP) .............................. JP2019-077265

(51) Int. Cl.
*G06Q 20/32* (2012.01)
(52) U.S. Cl.
CPC .................................. *G06Q 20/322* (2013.01)
(58) Field of Classification Search
CPC .................................................. G06Q 20/322
USPC .......................................................... 705/39
See application file for complete search history.

(56) References Cited

U.S. PATENT DOCUMENTS

| | | | | |
|---|---|---|---|---|
| 8,498,900 B1* | 7/2013 | Spirin | .................... | G06Q 20/14 705/30 |
| 9,990,659 B2* | 6/2018 | Shanmugam | ...... | G06Q 30/0603 |
| 10,192,213 B2* | 1/2019 | Bonsi | .................... | G06Q 20/206 |
| 10,204,335 B1* | 2/2019 | Donavalli | .............. | G06Q 20/14 |
| 2010/0069035 A1* | 3/2010 | Johnson | ................ | H04W 92/18 455/566 |
| 2011/0137804 A1* | 6/2011 | Peterson | ................. | H04W 4/02 705/77 |
| 2012/0136754 A1* | 5/2012 | Underwood | ........... | G06Q 30/06 715/764 |
| 2013/0085931 A1* | 4/2013 | Runyan | ................ | G06Q 20/325 705/40 |
| 2015/0269557 A1* | 9/2015 | Artman | .................. | G06Q 30/06 705/41 |
| 2018/0206177 A1* | 7/2018 | Daoura | .................... | H04W 4/12 |
| 2018/0253730 A1* | 9/2018 | Vohra | ..................... | G06Q 20/20 |

(Continued)

FOREIGN PATENT DOCUMENTS

JP  2016066158 A  4/2016

*Primary Examiner* — Mike Anderson
*Assistant Examiner* — Paul R Kloberg
(74) *Attorney, Agent, or Firm* — Alleman Hall Creasman & Tuttle LLP

(57) ABSTRACT

A payment support system includes a terminal ID acquisition processing unit, a position acquisition processing unit, an association processing unit, and a payment processing unit. The terminal ID acquisition processing unit acquires identification information of a user terminal of a user who entered a facility. The position acquisition processing unit acquires position information of the user terminal. The association processing unit stores the identification information acquired by the terminal ID acquisition processing unit and a use price of the facility of the user in a storage unit in association with each other. The payment processing unit executes a payment process of the use price when the user terminal is separated from a predetermined area of the facility by a predetermined distance or more after exiting the predetermined area.

11 Claims, 11 Drawing Sheets

(56) References Cited

U.S. PATENT DOCUMENTS

2019/0109935 A1* 4/2019 Nagao .................... H04M 1/02
2019/0297485 A1* 9/2019 Baldree ................ H04W 4/029

* cited by examiner

FIG. 3

| USER INFORMATION | | | |
|---|---|---|---|
| TERMINAL ID | USER ID | USER NAME | PAYMENT INFORMATION |
| ID_A | U001 | A | C1 |
| ID_B | U002 | B | C2 |
| ID_C | U003 | C | C3 |
| ID_D | U004 | D | C4 |
| ID_E | U005 | E | C5 |
| ID_F | U006 | F | C6 |
| ID_G | U007 | G | C7 |
| ID_H | U008 | H | C8 |
| ... | ... | ... | ... |

| TERMINAL INFORMATION ||||
|---|---|---|---|
| TABLE NUMBER | TERMINAL ID | TERMINAL POSITION | USE PRICE |
| T1 | ***** | ***** | ***** |
| T2 | ***** | ***** | ***** |
| ... | ... | ... | ... |
| T6 | ID_A | P001 | M1 |
| | ID_B | P002 | M2 |
| | ID_C | P003 | M3 |
| | ID_D | P004 | M4 |
| T7 | ID_E | P005 | M5 |
| ... | ... | ... | ... |
| T10 | ***** | ***** | ***** |

D2

PAYMENT SUPPORT SYSTEM, PAYMENT SUPPORT METHOD, AND NON-TRANSITORY RECORDING MEDIUM

INCORPORATION BY REFERENCE

This application is based upon and claims the benefit of priority from the corresponding Japanese Patent Application No. 2019-077265 filed on Apr. 15, 2019, the entire contents of which are incorporated herein by reference.

BACKGROUND OF THE INVENTION

1. Field of the Invention

The present disclosure relates to a payment support system, a payment support method, and a non-transitory recording medium.

2. Description of Related Art

There has been proposed a system for use in a restaurant where a user uses his/her mobile terminal to order foods and/or drinks, and uses the mobile terminal to pay the price for the foods and/or drinks. In addition, in recent years, there has been proposed a system for use at a store where a user carrying a mobile terminal can carry outside the store a product that the user desires to buy, and payment of a price of the product is automatically performed.

SUMMARY OF THE INVENTION

A payment support system relating to a first aspect of the present disclosure includes a terminal ID acquisition processing unit, a position acquisition processing unit, an association processing unit, and a payment processing unit. The terminal ID acquisition processing unit acquires identification information of a user terminal of a user who entered a facility. The position acquisition processing unit acquires position information of the user terminal. The association processing unit stores the identification information acquired by the terminal ID acquisition processing unit and a use price of the facility of the user in a storage unit in association with each other. The payment processing unit executes a payment process of the use price when the user terminal is separated from a predetermined area of the facility by a predetermined distance or more after exiting the predetermined area.

A payment support method relating to a second aspect of the present disclosure causes one or more processors to execute a terminal ID acquisition step, a position acquisition step, an association step, and a payment step. In the terminal ID acquisition step, identification information of a user terminal of a user who entered a facility is acquired. In the position acquisition step, position information of the user terminal is acquired. In the association step, the identification information acquired in the terminal ID acquisition step and a use price of the facility of the user are stored in a storage unit in association with each other. In the payment step, a payment process of the use price is executed when the user terminal is separated from a predetermined area of the facility by a predetermined distance or more after exiting the predetermined area.

A recording medium relating to a third aspect of the present disclosure is a non-transitory computer-readable recording medium on which is recorded a payment support program for causing one or more processors to execute a terminal ID acquisition step, a position acquisition step, an association step, and a payment step. In the terminal ID acquisition step, identification information of a user terminal of a user who entered a facility is acquired. In the position acquisition step, position information of the user terminal is acquired. In the association step, the identification information acquired in the terminal ID acquisition step and a use price of the facility of the user are stored in a storage unit in association with each other. In the payment step, a payment process of the use price is executed when the user terminal is separated from a predetermined area of the facility by a predetermined distance or more after exiting the predetermined area.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a diagram showing an example of user information used in the payment support system according to the embodiment of the present disclosure;

FIG. 4 is a diagram showing an example of terminal information used in the payment support system according to the embodiment of the present disclosure;

DETAILED DESCRIPTION OF EMBODIMENTS

The following describes an embodiment of the present disclosure with reference to the accompanying drawings for the understanding of the present disclosure. It should be noted that the following embodiment is an example of a specific embodiment of the present disclosure and should not limit the technical scope of the present disclosure.

Figure 1:
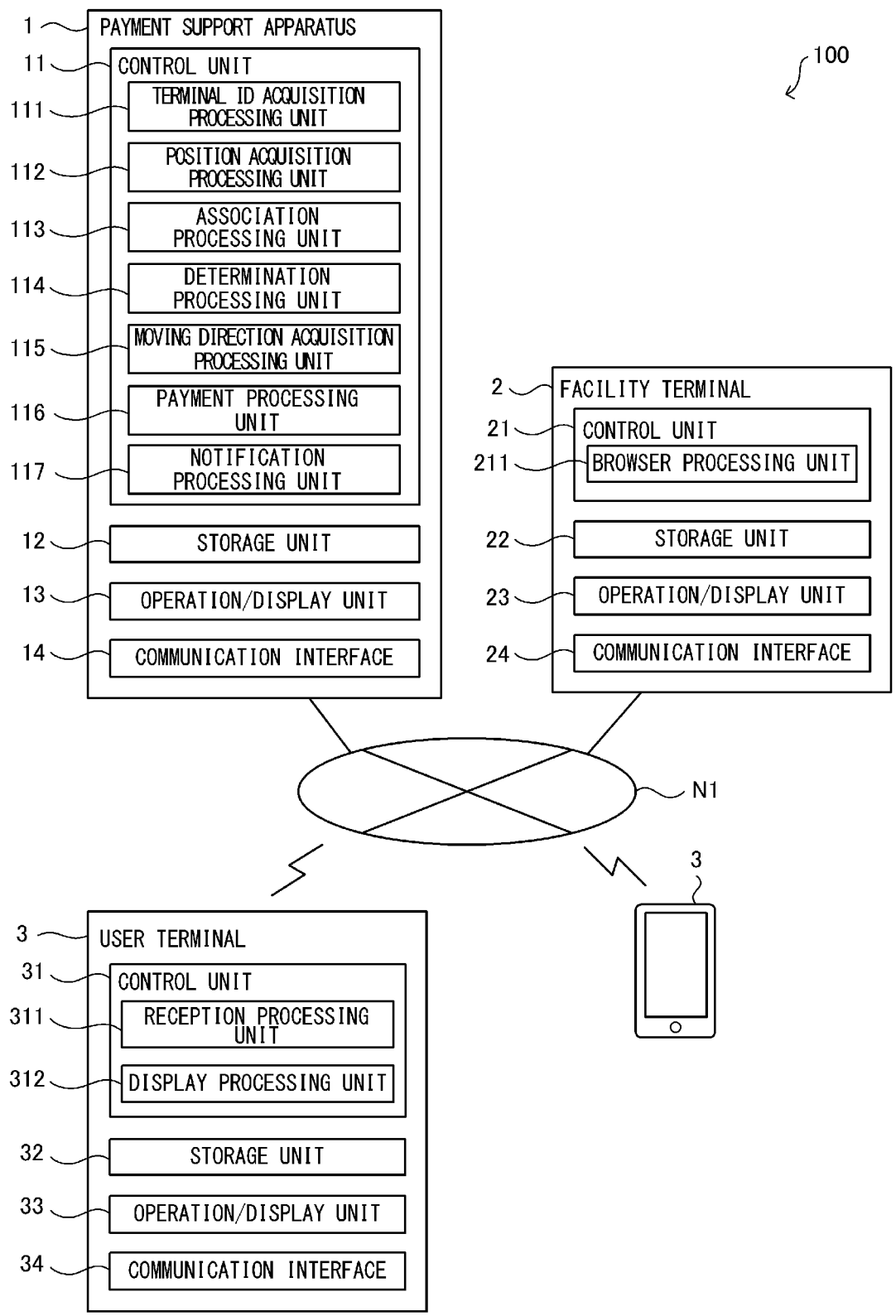
FIG. 1 is a block diagram showing a configuration of a payment support system according to an embodiment of the present disclosure.

As shown in FIG. 1, a payment support system 100 according to an embodiment of the present disclosure includes a payment support apparatus 1, a facility terminal 2, and a user terminal 3. The payment support apparatus 1, the facility terminal 2, and the user terminal 3 can communicate with each other via a communication network N1 that is, for example, the Internet, a LAN, a WAN, or a public telephone line. It is noted that a plurality of payment support apparatuses 1, a plurality of facility terminals 2, and a plurality of user terminals 3 may be provided. The payment support system 100 and the payment support apparatus 1 are each an example of a payment support system of the present disclosure. The user terminal 3 is an example of a user terminal of the present disclosure.

The payment support system according to the present disclosure is applicable to a facility in a business type that provides a service to users, such as a restaurant, a retail store, a hair dresser, a hotel, or a game hall. In the present embodiment, a "restaurant" is provided as an example of a facility according to the present disclosure. For example, the facility terminal 2 is provided on each table in the restaurant. For example, the facility terminal 2 may be an operation terminal (a self-ordering terminal) that is used by users of the restaurant to order desired products (for example, foods and drinks). The payment support apparatus 1 may be installed in a restaurant in which the facility terminal 2 is installed. Alternatively, the payment support apparatus 1 may be installed outside the restaurant, and may perform data communications with the facility terminal 2 and the user terminal 3 via the communication network N1.

In the present embodiment, a single piece of payment support apparatus 1 corresponds to the payment support system according to the present disclosure. However, not limited to this, the payment support system according to the present disclosure may include one or more components among the payment support apparatus 1, the facility terminal 2, and the user terminal 3. For example, in a case where two or more components among the payment support apparatus 1, the facility terminal 2, and the user terminal 3 share a payment support process (see, for example, FIG. 8) described below and execute it cooperatively, a system that includes the two or more components can be considered as the payment support system according to the present disclosure. For example, the payment support system according to the present disclosure may be composed of the payment support apparatus 1 and the user terminal 3.

Meanwhile, in a system where an automatic payment is made at a time point when a user exits the facility, the following problem may occur. For example, a user of a restaurant may temporarily exit the restaurant during eating in order to smoke or make a phone call, for example. In a case where after exiting the restaurant and a payment is completed, the user returns to the inside of the restaurant and orders an additional food and/or drink, another payment is required for the additional use price. In this case, the payment needs to be made a plurality of times. This is inconvenient for the user since it is difficult for the user to grasp a total use price. On the other hand, according to the payment support apparatus 1 of the present embodiment, it is possible to improve the convenience of a user by efficiently performing a payment of a use price of the user in a facility.

Figure 2:
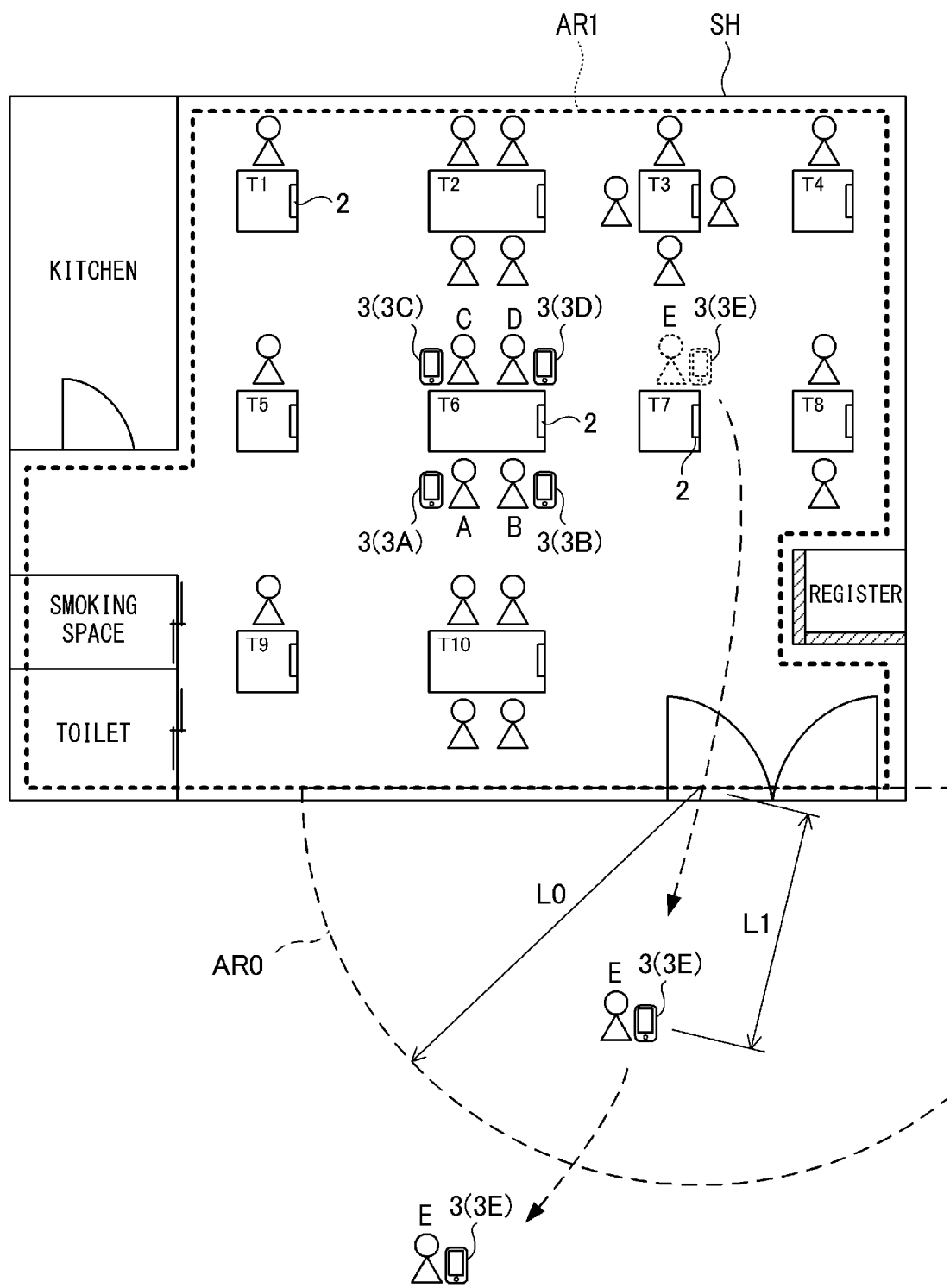
FIG. 2 is a schematic diagram showing a situation of inside of a restaurant to which the payment support system according to the embodiment of the present disclosure is applied.

Here is described an example of application of the payment support system 100 of the present embodiment. FIG. 2 is a schematic diagram showing a situation of inside of a restaurant SH. As shown in FIG. 2, in the restaurant SH, tables T1 to T10 are installed, and the facility terminal 2 (self-ordering terminal) is installed on each of the tables T1 to T10. Users enter the restaurant SH while carrying user terminals 3 (for example, smartphones) owned by the users. For example, FIG. 2 shows that users A, B, C, and D who respectively own user terminals 3A, 3B, 3C, and 3D use table T6 as one group, and user E who owns user terminal 3E uses table T7. Here, the payment support system 100 has a function to, when a user terminal 3 exits a predetermined area AR (an area AR1), automatically execute a payment process of a use price of the restaurant SH (a price for food and drink) based on payment information (credit card information) of the user.

In these circumstances, for example, the user E, after having entered the restaurant SH and been seated at table T7, causes the user terminal 3E to perform a data communication with the facility terminal 2 to perform a check-in process (described below). Subsequently, the user E orders a desired food and/or a drink by operating the facility terminal 2. Thereafter, if the user terminal 3E receives a phone call while the user E is eating a served food, the user E stops eating and temporarily exits the area AR1 (the inside of the restaurant). In this case, for example, the user E makes a telephone conversation near the entrance/exit of the restaurant SH at a position (of a predetermined distance L1 from the area AR1) within a range of less than a predetermined distance (distance L0) from the area AR1. In this case, the payment support system 100 determines that the user E has only temporarily exited and will come back to the area AR1 (the inside of the restaurant), and suspends execution of the payment process of the use price.

The user E then returns to the inside of the restaurant, finishes a meal, and exits the restaurant. In this case, when the user E is separated from the area AR1 by the predetermined distance (L0) or more (exits an area AR0) after exiting the area AR1, the payment support system 100 determines that the user E does not return to the area AR1 (the inside of the restaurant), and executes the payment process of the use price.

As described above, the payment process is not executed when a user temporarily exits the restaurant. As a result, it is possible to prevent the payment process from being executed at an unintended timing for the user. Accordingly, it is possible to perform the payment process efficiently and improve the convenience of the user.

The following describes a specific configuration of the payment support system 100.

[Payment Support Apparatus 1]

As shown in FIG. 1, the payment support apparatus 1 includes a control unit 11, a storage unit 12, an operation/display unit 13, and a communication interface 14. The payment support apparatus 1 may be an information processing apparatus such as a server, a tablet terminal, or a personal computer. In addition, various processes executed in the payment support apparatus 1 may be executed by a plurality of processors by distribution.

The communication interface 14 is configured to connect the payment support apparatus 1 to the communication network N1 wirelessly or with cable, and execute a data communication with external devices such as the facility terminal 2 and the user terminal 3 via the communication network N1 in accordance with a predetermined communication protocol.

The operation/display unit 13 is a user interface including a display unit and an operation unit, wherein the display unit is, for example, a liquid crystal display or an organic EL display for displaying various types of information, and the operation unit is, for example, a mouse, a keyboard, or a touch panel for receiving operations.

The storage unit 12 is a nonvolatile storage unit such as a HDD (Hard Disk Drive), a SSD (Solid State Drive), or a flash memory that stores various types of information. Data such as user information D1 and terminal information D2 is stored in the storage unit 12. FIG. 3 is a diagram showing an example of the user information D1. FIG. 4 is a diagram showing an example of the terminal information D2.

As shown in FIG. 3, the user information D1 includes various information regarding users of the restaurant SH. The users register themselves in advance at a web site managed by the restaurant SH. Specifically, the users use the user terminals 3 to access the web site of the restaurant SH, and on a user registration screen, register the name, address, mail address, payment information (credit card information) or the like. The payment support apparatus 1 acquires and registers the pieces of information in the user information D1. As shown in FIG. 3, the user information D1 includes information: "terminal ID", "user ID", "user name", and "payment information". The "terminal ID" is identification information of the user terminals 3. The payment support apparatus 1 acquires the identification information of a user terminal 3 when the user terminal 3 accesses the web site. The "user ID" is identification information of users. The user ID may be input by the users themselves or set by the payment support apparatus 1 arbitrarily. The "user name" includes names registered by the users. The "payment information" is information regarding the payment methods registered by the users. The payment information includes, for example, information such as a credit card company (payment company), a credit card number, and an expiration date.

It is noted that a user may register the user information D1 before he/she comes to the restaurant SH or within the restaurant SH after coming. Having registered the user information D1, the user can use a pay-later payment process for automatically paying a use price of the restaurant SH after the exit. The user who has not registered the user information D1 needs to perform a normal payment process to pay the use price at the register (account terminal) by cash, credit card, or electronic money when exiting the restaurant SH.

As shown in FIG. 4, the terminal information D2 includes information regarding the user terminals 3 of the users who visited the restaurant SH. The terminal information D2 shown in FIG. 4 includes information: "table number", "terminal ID", "terminal position", and "use price". The "table number" is information of numbers (identification information) assigned to tables (seats, or private rooms) installed in the restaurant SH. The "terminal ID" is identification information of the user terminals 3. For example, in a case where the user E visits the restaurant SH, is seated at a table with table number "T7", and performs a check-in operation on a facility terminal 2 installed on the table by using the user terminal 3E, the payment support apparatus 1 acquires a terminal ID "ID_E" of the user terminal 3E, and registers the acquired terminal ID "ID_E" in the terminal information D2 in association with the table number "T7". The "terminal position" is position information of the user terminal 3. For example, the payment support apparatus 1 acquires position information from the user terminal 3 by using a communication function such as GPS (Global Positioning System) or beacon, and registers the acquired position information in the terminal information D2 in association with the terminal ID. The payment support apparatus 1 acquires the position information from the user terminal 3 on a regular basis, and updates the information of "terminal position" in the terminal information D2. The "use price" is information of prices for the foods and drinks eaten and drunk by the users of the restaurant SH. For example, the payment support apparatus 1 acquires information of a food and/or a drink that a user ordered by operating a facility terminal 2, calculates a total use price, and registers the calculated total use price in the terminal information D2 in association with the terminal ID. The use prices are registered in the "use price" for each user. It is noted that in a case where a group of users use one table, the payment support apparatus 1 may register, in the terminal information D2, a total use price for all foods and drinks ordered by the group of users in association with the table. For example, the payment support apparatus 1 may register, in the terminal information D2, a total use price ("M1"+"M2"+"M3"+"M4") of users A, B, C, and D in association with table number "T6". For example, each piece of information registered in the terminal information D2 may be deleted after completion of payment of a corresponding use price.

It is noted that as another embodiment, part or all of the information such as the user information D1 and the terminal information D2 may be recorded in the facility terminal 2, or stored in a server which can be accessed by the payment support apparatus 1. In that case, the control unit 11 of the payment support apparatus 1 may acquire the information from the facility terminal 2 or the server to execute a process such as the payment support process (see, for example, FIG. 8) described below.

In addition, control programs such as a payment support program are stored in the storage unit 12, wherein the payment support program is used to execute the payment support process (see, for example, FIG. 8) that is described below. For example, the payment support program is recorded on a non-transitory computer-readable recording medium such as a USB, a CD, or a DVD, and is read from the recording medium by a reader (not shown) such as a USB drive, a CD drive or a DVD drive electrically connected to the payment support apparatus 1, and the payment support program is stored in the storage unit 12. In addition, the payment support program may be downloaded from a server that can be accessed by the payment support apparatus 1, and stored in the storage unit 12.

The control unit 11 includes control equipment such as a CPU, a ROM, and a RAM. The CPU is a processor for executing various types of calculation processes. The ROM is a nonvolatile storage unit in which control programs such as a BIOS and an OS for causing the CPU to execute various types of calculation processes are stored in advance. The RAM is a volatile or nonvolatile storage unit that is used as a temporary storage memory (working area) for the various types of processes executed by the CPU. The control unit 11 controls the payment support apparatus 1 by causing the CPU to execute various types of control programs that have been stored in the ROM or the storage unit 12 in advance.

Specifically, as shown in FIG. 1, the control unit 11 includes various processing units such as a terminal ID acquisition processing unit 111, a position acquisition processing unit 112, an association processing unit 113, a determination processing unit 114, a moving direction acquisition processing unit 115, a payment processing unit 116, and a notification processing unit 117. It is noted that the control unit 11 functions as the terminal ID acquisition processing unit 111, the position acquisition processing unit 112, the association processing unit 113, the determination processing unit 114, the moving direction acquisition processing unit 115, the payment processing unit 116, and the notification processing unit 117 when it causes the CPU to execute various processes in accordance with the payment support program. In addition, a part or all of the processing units of the control unit 11 may be provided as an electronic circuit. It is noted that the payment support program may be a program for functioning a plurality of processors as the various processing units.

The terminal ID acquisition processing unit 111 acquires identification information (terminal IDs) of user terminals 3 of the users who visited the restaurant SH. The terminal ID acquisition processing unit 111 is an example of a terminal ID acquisition processing circuit of the present disclosure. For example, when a user enters the restaurant SH, is seated at a table with a desired table number, and performs the check-in process (described below) on a facility terminal 2 installed on the table by using his/her user terminal 3, the terminal ID acquisition processing unit 111 acquires a terminal ID of the user terminal 3 from the facility terminal 2. Having acquired the terminal ID, the terminal ID acquisition processing unit 111 consults the user information D1 (see FIG. 3) to identify the user ID, the user name, the payment information and so on, and registers the acquired terminal ID in the terminal information D2 (see FIG. 4) in association with the identification information of the table (table number) (check-in process).

It is noted here that in the payment support system 100, the user terminal 3 may be checked in by using, instead of the user information of the restaurant SH, user information registered in a system (a payment company server or the payment support apparatus 1) that is desired by the user to make the payment. For example, the payment support system 100 may be configured to perform the check-in process of the user terminal 3 by allowing the user terminal 3 to perform a communication with the payment company server or the payment support apparatus 1; or perform the check-in process of the user terminal 3 by allowing the user terminal 3 to perform a communication with the facility terminal 2. It is noted that in the latter configuration, for example, the payment support system 100 may acquire the user information from the payment company server or the payment support apparatus 1 to perform the check-in process.

The position acquisition processing unit 112 acquires position information of the user terminal 3. The position acquisition processing unit 112 is an example of a position acquisition processing circuit of the present disclosure. Specifically, the position acquisition processing unit 112 acquires position information of the user terminal 3 that corresponds to the terminal ID acquired by the terminal ID acquisition processing unit 111. For example, the position acquisition processing unit 112 acquires the position information from the user terminal 3 by using a communication function such as the GPS or beacon. The position acquisition processing unit 112 registers the acquired position information in the terminal information D2 (see FIG. 4) in association with the terminal ID. In addition, the position acquisition processing unit 112 acquires the position information on a regular basis, and updates "terminal position" in the terminal information D2.

The association processing unit 113 stores the terminal ID acquired by the terminal ID acquisition processing unit 111 and the use price of the user in the storage unit 12 in association with each other. The association processing unit 113 is an example of an association processing circuit of the present disclosure. Specifically, the association processing unit 113 registers the terminal ID and the use price in the terminal information D2 (see FIG. 4) in association with each other. Here, the control unit 11 acquires, from the facility terminal 2, information of the food and/or the drink that the user ordered by operating the facility terminal 2, and calculates a total use price. The association processing unit 113 registers the calculated use price in the terminal information D2 in association with the terminal ID.

In addition, the control unit 11 may transmit information of the calculated use price to an account terminal (not shown). Upon acquiring the information of the use price, the account terminal may perform the normal payment process. In addition, the facility terminal 2 may acquire the information of the use price from the payment support apparatus 1, and perform the normal payment process.

The determination processing unit 114 determines whether or not the user terminal 3 is being used by its user. The determination processing unit 114 is an example of a determination processing circuit of the present disclosure. Specifically, the determination processing unit 114 determines whether or not the user is having a conversation on the user terminal 3, whether or not the user is working on an e-mail on the user terminal 3, or whether or not the user is performing a web search on the user terminal 3.

The moving direction acquisition processing unit 115 acquires a moving direction of the user terminal 3. The moving direction acquisition processing unit 115 is an example of a moving direction acquisition processing circuit of the present disclosure. Specifically, the moving direction acquisition processing unit 115 identifies, based on the position information of the user terminal 3, a direction in which a user who was seated at a table moves after leaving the table (a moving destination). For example, the moving direction acquisition processing unit 115 acquires a signal from communication equipment (for example, a beacon) installed in the restaurant SH or in the user terminal 3, and acquires, from the signal, a position, a moving direction, a moving route, or a moving destination of the user terminal 3.

Figure 5:
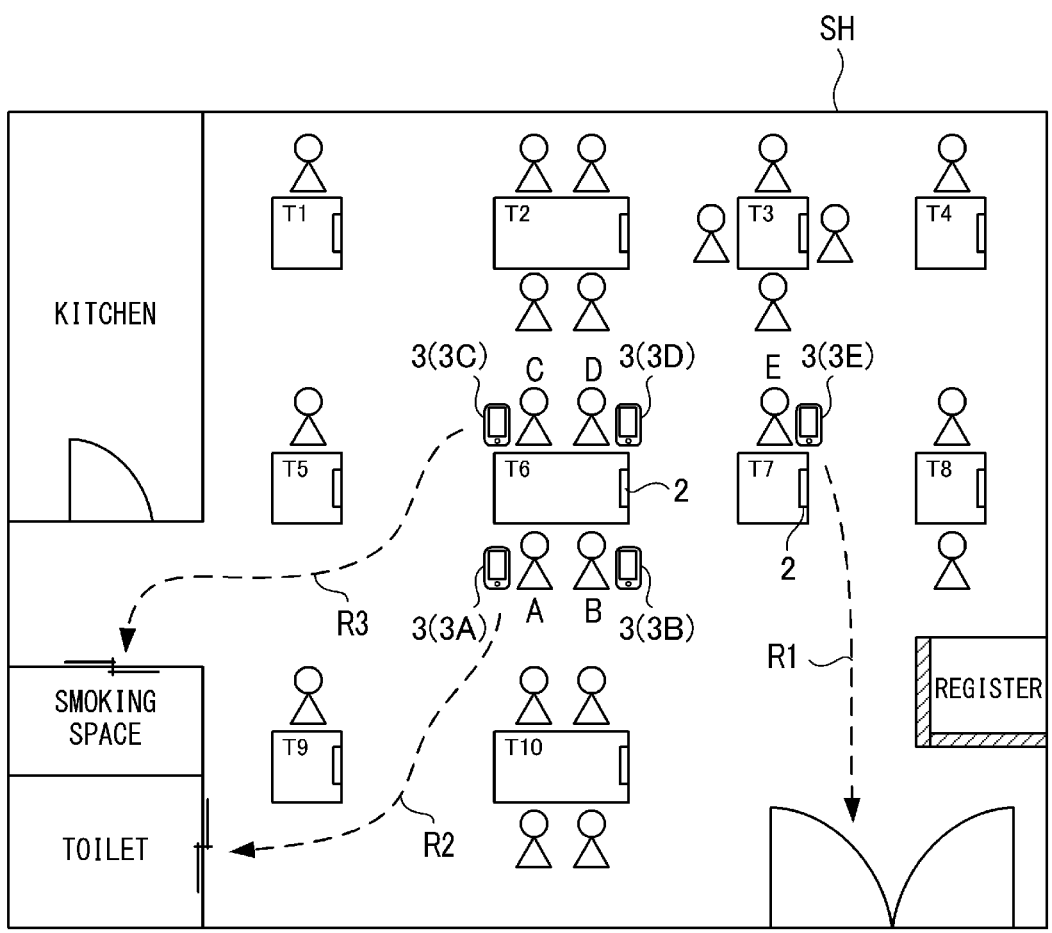
FIG. 5 is a schematic diagram showing a situation of the inside of the restaurant to which the payment support system according to the embodiment of the present disclosure is applied.

For example, as shown in FIG. 5, when the user E carrying the user terminal 3E moves along a route R1, the moving direction acquisition processing unit 115 acquires, as a moving direction, a direction toward the entrance/exit (the outside) of the restaurant SH. That is, the moving direction acquisition processing unit 115 identifies "the entrance/exit" as the moving destination of the user E (user terminal 3E). In addition, when the user A carrying the user terminal 3A moves along a route R2, the moving direction acquisition processing unit 115 acquires, as a moving direction, a direction toward a toilet of the restaurant SH. That is, the moving direction acquisition processing unit 115 identifies "the toilet" as the moving destination of the user A (user terminal 3A). In addition, when the user C carrying the user terminal 3C moves along a route R3, the moving direction acquisition processing unit 115 acquires, as a moving direction, a direction toward a smoking space of the restaurant SH. That is, the moving direction acquisition processing unit 115 identifies "the smoking space" as the moving destination of the user C (user terminal 3C).

The payment processing unit 116 is configured to execute a payment process of a use price when the user terminal 3 is separated from the predetermined area AR of the restaurant SH by a predetermined distance or more after exiting the predetermined area AR. For example, in the example shown in FIG. 2, the payment processing unit 116 executes the payment process of the use price when the user terminal 3 exits the area AR0 that is an area of the predetermined distance (L0) from the area AR1 of the restaurant SH. Specifically, when the control unit 11 detects that the user terminal 3 has exited the predetermined area AR of the restaurant SH and is separated therefrom by the predetermined distance or more based on the position information of the user terminal 3, and acquires the identification information (terminal ID) of the user terminal 3, the payment processing unit 116 acquires the user ID and the payment information associated with the terminal ID (see FIG. 3), and the use price (see FIG. 4) associated with the terminal ID, and executes the payment process of the use price. The payment processing unit 116 is an example of a payment processing circuit of the present disclosure.

It is noted that in the present disclosure, the payment process may be executed to transmit a payment request for a use price to a payment company server (payment apparatus), or may be executed to complete the payment of the use price. For example, the payment processing unit 116 transmits a payment request including information such as the user ID, a shop ID of the restaurant, and a charge for the use price, to a payment company server (payment apparatus) associated with the user ID. After the payment company server completes the payment for the payment request, the payment processing unit 116 acquires a payment completion notice (authentication notice) from the payment company server. The payment company server may be or may not be included in the payment support system 100. In addition, for example, the payment processing unit 116 completes the payment of the use price in the payment support apparatus 1. For example, in the payment support apparatus 1, the payment processing unit 116 may execute a process to reduce the use price from an electronic money balance associated with the user ID.

Figure 6:
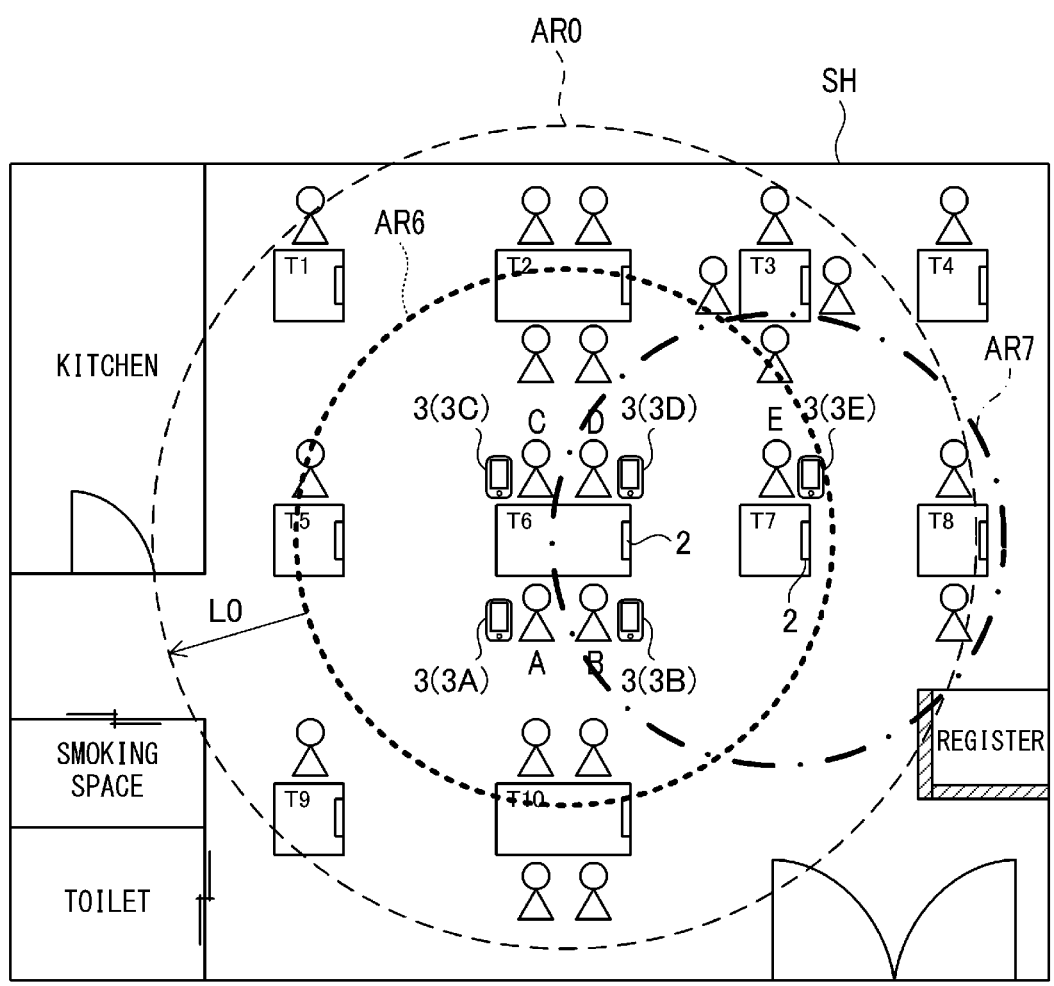
FIG. 6 is a diagram showing an example of a predetermined area and a predetermined distance set in the payment support system according to the embodiment of the present disclosure.

Here, the predetermined area AR is set by the manager of the restaurant SH. Specifically, the manager sets the predetermined area AR by adjusting the communication environment (layout, communication intensity, etc.) of communication devices installed in the restaurant SH. The predetermined area AR may be a specific area in the restaurant SH, may be within a range of a predetermined distance from the restaurant SH, may be a communication area in which a communication with the payment support apparatus 1 is available, or may be a communication area in which a communication intensity with the payment support apparatus 1 is equal to or higher than a threshold. For example, an area around the table or the area AR1 that is the whole internal area of the restaurant SH is set as the predetermined area AR. For example, as shown in FIG. 2, the area AR1 that is the whole internal area of the restaurant SH (excluding the register and the kitchen) may be set as the predetermined area AR. In addition, as shown in FIG. 6, an area around each table may be set as the predetermined area AR. In the example shown in FIG. 6, an area AR6 is the predetermined area AR set for the table T6, and an area AR7 is the predetermined area AR set for the table T7.

In addition, for example, the predetermined distance is set by the manager of the restaurant SH. Specifically, the manager sets the predetermined distance by adjusting the communication environment (layout, communication intensity, etc.) of communication devices installed in the restaurant SH. The predetermined distance may be a specific distance from the predetermined area AR, may correspond to a communication area in which a communication with the payment support apparatus 1 is available, or may correspond to a communication area in which a communication intensity with the payment support apparatus 1 is equal to or higher than a threshold. In addition, the predetermined distance may be a linear distance from the predetermined area AR, or may be a distance on a route from the predetermined area AR. In addition, an area formed within a range of a predetermined distance from the predetermined area AR may be the area AR0 shown in FIG. 2 that is in a circle with the predetermined distance L0 as a radius, centering around an exit of the predetermined area AR from which the user terminal 3 exits. In addition, an area formed as a range of the predetermined distance L0 from the predetermined area AR may be the area AR0 shown in FIG. 6 that is a range of the predetermined distance L0 from the predetermined area AR.

In addition, the predetermined distance may be set based on the position or the size of the predetermined area AR. For example, in a case where the predetermined area AR is set as an area around a table, the predetermined distance may be set as a different value for each table that is located at a different position. In addition, the predetermined distance may be set based on the use price or the time of day. For example, the predetermined distance may be set such that the higher the use price is, the shorter the predetermined distance is. This allows a payment process of a high use price to be executed with priority. In addition, the predetermined distance may be set such that the closer to the business end time the time is, the shorter the predetermined distance is. This prevents, for example, a payment omission due to the end of the business.

The control unit 11 determines whether the user terminal 3 is present in or has exited the predetermined area AR, based on the position information of the user terminal 3 (see FIG. 4).

Here, a user (a user terminal 3) may temporarily exit (leave) the predetermined area AR of the restaurant SH, and a payment process of a use price may be executed. Subsequently, when the user returns to the restaurant and orders an additional food and/or drink, another payment process is required for the additional use price. That is, the payment process is executed a plurality of times. Such a payment process is inefficient and inconvenient for the user.

In view of the above-described problem, the payment processing unit 116 is configured not to execute the payment process of the use price unless the user terminal 3 is separated from the predetermined area AR by the predetermined distance (L0) or more after exiting the predetermined area AR. That is, the payment processing unit 116 executes the payment process of the use price on condition that the user terminal 3 is separated from the predetermined area AR by the predetermined distance (L0) or more after exiting the predetermined area AR. The predetermined distance is set to, for example, a distance that allows the user terminal 3 to communicate with the payment support apparatus 1 by using beacon. For example, the predetermined distance is set to 10 m.

For example, if the user terminal 3E receives a phone call while the user E is eating a served food at table T7, the user E stops eating and temporarily exits (leaves) the area AR1 (the inside of the restaurant). The control unit 11 records the exit position (for example, the entrance/exit), and starts to measure the distance. If the user E finishes the telephone conversation and returns to the inside of the restaurant before being separated from the exit position by the predetermined distance (for example, L0=10 m) or more, the control unit 11 ends the measurement of the distance. In this case, since the user terminal 3 had not been separated from the exit position by the predetermined distance (L0) or more after exiting the area AR1, the payment processing unit 116 does not execute but suspends the payment process of the use price for the foods and drinks ordered so far. Subsequently, if the user E returns to table T7 and orders additional foods and/or drinks, the control unit 11 acquires information of the ordered foods and drinks from the facility terminal 2, and updates the use price. Thereafter, when the user E finishes the meal, exits (leaves) the area AR1 (the inside of the restaurant), and is separated from the area AR1 by the predetermined distance (for example, 10 m) or more, the payment processing unit 116 executes the payment process of the updated use price.

It is noted that even in a case where the user (the user terminal 3) temporarily exits the area AR1 to have a telephone conversation or the like, if the user E is separated from the predetermined area AR1 by the predetermined distance or more after exiting the area AR1, the payment processing unit 116 executes the payment process of the use price for the foods and drinks ordered so far. This prevents, for example, an illegal act of leaving the restaurant without paying the use price.

As another embodiment, the payment processing unit 116 may be configured not to execute the payment process in a case where the user terminal 3 is separated from the predetermined area AR by the predetermined distance or more after exiting the predetermined area AR, and the user terminal 3 is being used. That is, the payment processing unit 116 may determine whether or not to execute the payment process by taking into consideration the determination result of the determination processing unit 114.

For example, when it is determined that the user E is using the user terminal 3 (for example, making a telephone conversation) when or after the user E (the user terminal 3E) exits the predetermined area AR, the payment processing unit 116 does not execute the payment process even if the user E is separated from the predetermined area AR by the predetermined distance or more after exiting the predetermined area AR. On the other hand, when it is determined that the user E is not using the user terminal 3 when or after the user E (the user terminal 3E) exits the predetermined area AR, the payment processing unit 116 executes the payment process on condition that the user E is separated from the predetermined area AR by the predetermined distance or more after exiting the predetermined area AR.

Figure 7:
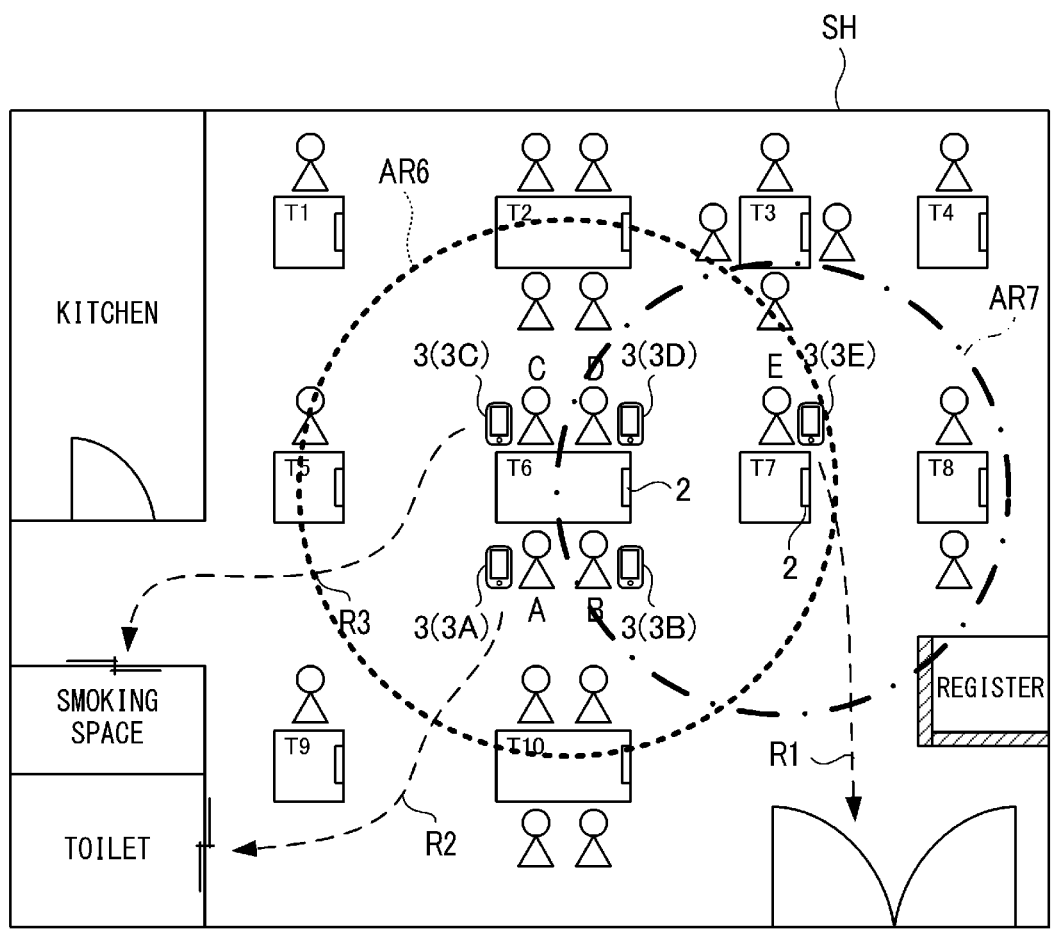
FIG. 7 is a schematic diagram showing a situation of the inside of the restaurant to which the payment support system according to the embodiment of the present disclosure is applied.

As a further embodiment, the payment processing unit 116 may be configured not to execute the payment process when the user terminal 3 is separated from the predetermined area AR by the predetermined distance or more after exiting the predetermined area AR, and the user terminal 3 has moved in a predetermined direction. That is, the payment processing unit 116 may determine whether or not to execute the payment process, based on the moving direction of the user terminal 3 acquired by the moving direction acquisition processing unit 115. For example, the configuration is suitable for a case where, as shown in FIG. 7, the moving destination in the predetermined direction is located outside the predetermined area AR. In addition, the predetermined direction is a direction toward a use object (a toilet, a smoking space, etc.) that is temporarily used by a user who leaves his/her table.

For example, as shown in FIG. 7, when the user A moves along the route R2, the moving direction acquisition processing unit 115 acquires, as the moving direction, a direction toward the toilet of the restaurant SH. The direction toward the toilet is an example of a predetermined direction of the present disclosure. In this case, there is a high possibility that, after using the toilet, the user A returns to the table T6. For this reason, even if the user A is separated from the area AR6 by the predetermined distance (L0) or more after exiting the area AR6, the payment processing unit 116 does not execute the payment process. On the other hand, when the moving direction of the user A is different from the predetermined direction (for example, when the moving direction of the user A is a direction toward the entrance/exit of the restaurant SH), the payment processing unit 116 executes the payment process on condition that the user A is separated from the area AR6 by the predetermined distance (L0) or more after exiting the area AR6.

Similarly, when the user C moves along route R3, the moving direction acquisition processing unit 115 acquires, as the moving direction, a direction toward the smoking space of the restaurant SH. The direction toward the smoking space is another example of the predetermined direction of the present disclosure. In this case, there is a high possibility that, after using the smoking space, the user C returns to the table T6. For this reason, even if the user C is separated from the area AR6 by the predetermined distance (L0) or more after exiting the area AR6, the payment processing unit 116 does not execute the payment process. On the other hand, when the moving direction of the user C is, for example, a direction toward the entrance/exit of the restaurant SH, the payment processing unit 116 executes the payment process on condition that the user C is separated from the area AR6 by the predetermined distance (L0) or more after exiting the area AR6. It is noted that in the present embodiment, the area AR6 is set to be more inside than the moving destination of the predetermined direction (for example, the toilet or the smoking space). That is, the moving destination is set to be outside the area AR6.

The notification processing unit 117 transmits, to the user terminal 3, an announcement message indicating that the payment process is to be executed, when the user terminal 3 has exited the predetermined area AR; and the notification processing unit 117 transmits, to the user terminal 3, a completion message indicating that the payment process has been completed, when the payment process has been completed. The notification processing unit 117 is an example of a notification processing circuit of the present disclosure. For example, the announcement message includes: a message indicating that the payment process is executed when the user terminal 3 is separated from the restaurant by N meters or more; and a message indicating that the payment process is not executed but is suspended if the user terminal 3 returns to the inside of the restaurant without being separated from the restaurant by N meters or more. In addition, the completion message includes information such as the paid amount of money, and the date/time at which the payment was made. This, for example, allows the user to recognize that the payment process is executed when the user is separated from the predetermined area AR by the predetermined distance or more after temporarily exiting the predetermined area AR.

In addition, as another embodiment, when the user has exited the predetermined area AR, the notification processing unit 117 may transmit different messages depending on the distance from the predetermined area AR. For example, the notification processing unit 117 transmits a first announcement message when the user terminal 3 is separated from the predetermined area AR by a first specific distance or more after exiting the predetermined area AR; and the notification processing unit 117 transmits a second announcement message when the user terminal 3 is separated from the predetermined area AR by a second specific distance or more after exiting the predetermined area AR (the second specific distance>the first specific distance). For example, the first announcement message indicates the use price, and the second announcement message indicates that the payment process of the use price is to be executed.

[Facility Terminal 2]

As shown in FIG. 1, the facility terminal 2 includes a control unit 21, a storage unit 22, the operation/display unit 23, and a communication interface 24. For example, the facility terminal 2 may be an information processing apparatus such as a tablet terminal or a personal computer.

The communication interface 24 is configured to connect the facility terminal 2 to the communication network N1 wirelessly or with cable, and execute a data communication with external devices such as the payment support apparatus 1 and the user terminal 3 via the communication network N1 in accordance with the predetermined communication protocol.

The operation/display unit 23 is a user interface including a display unit and an operation unit, wherein the display unit is, for example, a liquid crystal display or an organic EL display for displaying various types of information, and the operation unit is, for example, a mouse, a keyboard, or a touch panel for receiving operations. The operation/display unit 23 displays a check-in screen, a menu screen for foods and drinks, and an accounting screen. In addition, the operation/display unit 23 receives a user operation performed to select a menu on the menu screen.

The storage unit 22 is a nonvolatile storage unit such as a HDD, a SSD, or a flash memory that stores various types of information. For example, control programs such as a browser program are stored in the storage unit 22. Specifically, the browser program is a control program that causes the control unit 21 to execute a communication process with external devices such as the payment support apparatus 1 and the user terminal 3 in accordance with a communication protocol such as HTTP (Hypertext Transfer Protocol).

In addition, the storage unit 22 stores data of the check-in screen, the menu screen, and the accounting screen displayed on the operation/display unit 23.

The control unit 21 includes control equipment such as a CPU, a ROM, and a RAM. The CPU is a processor for executing various types of calculation processes. The ROM is a nonvolatile storage unit in which control programs such as a BIOS and an OS for causing the CPU to execute various types of calculation processes are stored in advance. The RAM is a volatile or nonvolatile storage unit that is used as a temporary storage memory (working area) for the various types of processes executed by the CPU. The control unit 21 controls the facility terminal 2 by causing the CPU to execute various types of control programs that have been stored in the ROM or the storage unit 22 in advance.

Specifically, the control unit 21 functions as a browser processing unit 211 when it executes various processes in accordance with the browser program stored in the storage unit 22. The browser processing unit 211 is configured to execute a browser process to display, on the operation/display unit 23, various information provided from the payment support apparatus 1 via the communication network N1, and input an operation performed on the operation/display unit 23, to the payment support apparatus 1. It is noted that a part or all of the processing units of the control unit 21 may be provided as an electronic circuit.

For example, the control unit 21 receives a check-in operation from a user who is seated at a table. The user holds a QR code (including the terminal ID and the user ID) displayed on the user terminal 3, over a QR code reading unit of the facility terminal 2. The control unit 21 acquires the terminal ID and the user ID from the read QR code, and transmits the information of the acquired terminal ID and user ID to the payment support apparatus 1.

In addition, for example, the control unit 21 transmits, to the payment support apparatus 1, information (order information) of foods and drinks selected by the user on the menu screen, together with the identification information of the table (table number). In addition, the control unit 21 may transmit the order information to a kitchen terminal (not shown).

[User Terminal 3]

As shown in FIG. 1, the user terminal 3 includes a control unit 31, a storage unit 32, an operation/display unit 33, and a communication interface 34. The user terminal 3 is a mobile terminal carried by a user of the restaurant SH, and is, for example, a mobile-type information processing apparatus such as a smartphone, a mobile phone, or a tablet terminal.

The communication interface 34 is configured to connect the user terminal 3 to the communication network N1 wirelessly or with cable, and execute a data communication with external devices such as the payment support apparatus 1 and the facility terminal 2 via the communication network N1 in accordance with the predetermined communication protocol.

The operation/display unit 33 is a user interface including a display unit and an operation unit, wherein the display unit is, for example, a liquid crystal display or an organic EL display for displaying various types of information, and the operation unit is, for example, a mouse, a keyboard, or a touch panel for receiving operations.

The storage unit 32 is a nonvolatile storage unit such as a flash memory that stores various types of information. For example, control programs for causing the photoconductor drum 31 to execute various processes are stored in the storage unit 32.

The control unit 31 includes control equipment such as a CPU, a ROM, and a RAM. The CPU is a processor for executing various types of calculation processes. The ROM is a nonvolatile storage unit in which control programs such as a BIOS and an OS for causing the CPU to execute various types of calculation processes are stored in advance. The RAM is a volatile or nonvolatile storage unit that is used as a temporary storage memory (working area) for the various types of processes executed by the CPU. The control unit 31 controls the user terminal 3 by causing the CPU to execute various types of control programs that have been stored in the ROM or the storage unit 32 in advance.

Specifically, the control unit 31 includes various types of processing units such as a reception processing unit 311 and a display processing unit 312. It is noted that the control unit 31 functions as the various types of processing units when it causes the CPU to execute various processes in accordance with the control programs. In addition, a part or all of the processing units of the control unit 31 may be provided as an electronic circuit.

The reception processing unit 311 acquires information of an operation performed by a user of the restaurant SH on the operation/display unit 33 of the user terminal 3. For example, the reception processing unit 311 acquires information of a user registration operation performed by the user on the web site managed by the restaurant SH. In addition, the reception processing unit 311 acquires information of a check-in operation performed by the user at a table of the restaurant SH. For example, the reception processing unit 311 receives an operation from the user for reading a QR code that includes the terminal ID and the user ID.

The display processing unit 312 displays various types of information on the operation/display unit 33. For example, the display processing unit 312 displays information of the web site (the user registration screen or the like) on the operation/display unit 33. In addition, for example, the display processing unit 312 displays the QR code on the operation/display unit 33. In addition, for example, the display processing unit 312 displays, on the operation/display unit 33, various messages notified from the payment support apparatus 1.

In addition, the control unit 31 acquires position information of the user terminal 3 by using a communication function such as the GPS or beacon. The control unit 31 transmits the acquired position information to the payment support apparatus 1 together with the terminal ID.

[Payment Support Process]

Figure 8:
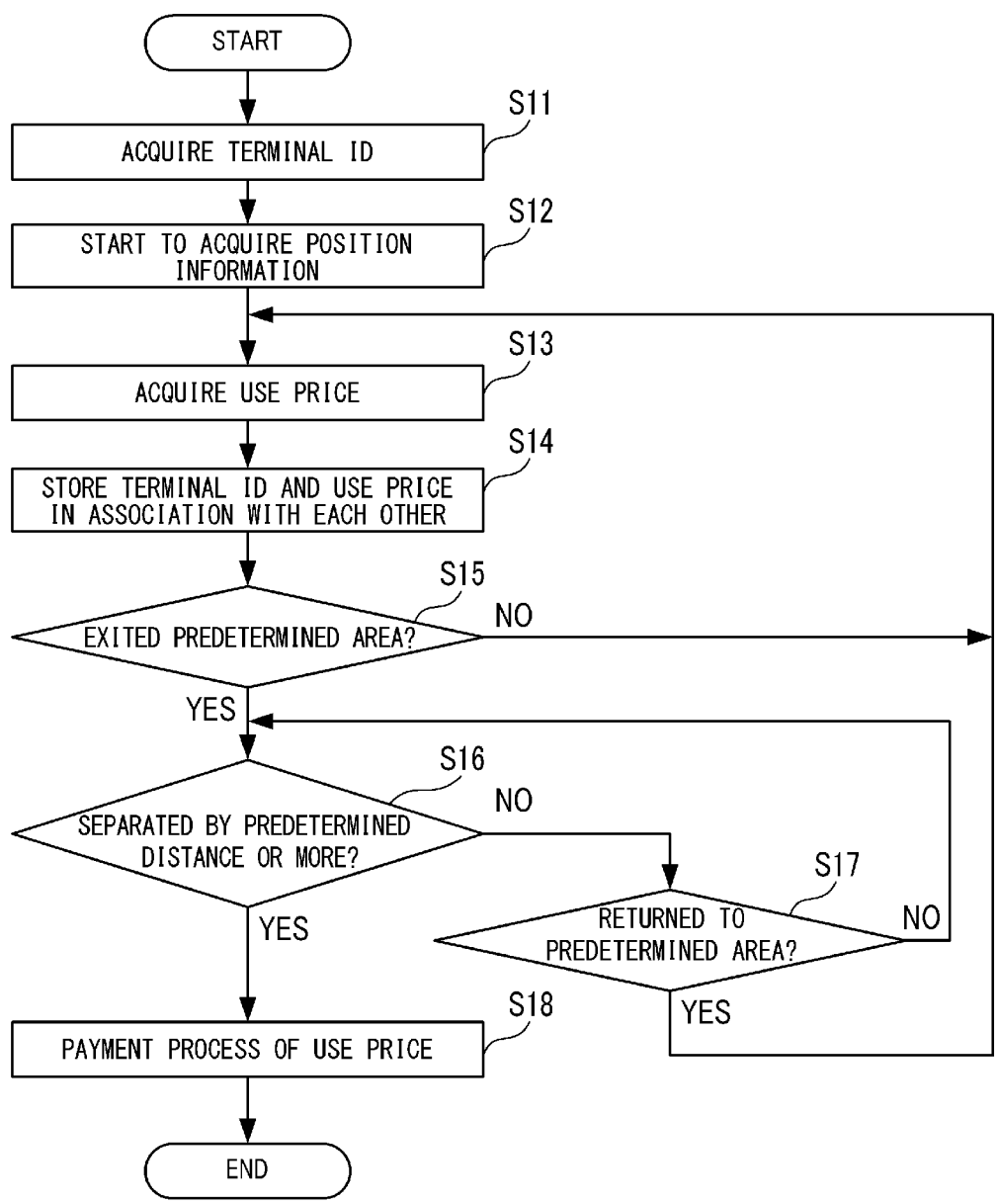
FIG. 8 is a flowchart showing an example of a procedure of a payment support process executed in the payment support system according to the embodiment of the present disclosure.

The following describes an example of a payment support process executed by the control unit 11 of the payment support apparatus 1, with reference to FIG. 8. The control unit 11 starts to execute the payment support process by starting to execute the payment support program when a user performs a predetermined operation, such as when a user performs a check-in operation on a facility terminal 2 by using a user terminal 3. It is noted that the payment support process may be ended halfway in response to a predetermined operation performed on the payment support apparatus 1.

It is noted that the present disclosure can be considered as an invention of a payment support method that executes one or more steps included in the payment support process.

In addition, one or more steps included in the payment support process described here may be omitted as necessary. In addition, the steps constituting the payment support process may be executed in a different order as far as the same action and effect are produced. Furthermore, although the present embodiment describes an example case where the steps constituting the payment support process are executed by the control unit 11, in another embodiment, the steps may be executed by a plurality of processors by distribution.

First, in step S11, the control unit 11 acquires a terminal ID of a user terminal 3 that is owned by a user who entered the restaurant SH. For example, when the user performs the check-in operation on (for example, holds the QR code over) a facility terminal 2 installed on a table by using the user terminal 3, the control unit 11 acquires the terminal ID of the user terminal 3 and the user ID from the facility terminal 2. The control unit 11 registers the acquired terminal ID in the terminal information D2 (see FIG. 4) in association with the identification information of the table (table number). The process of step S11 is executed by the terminal ID acquisition processing unit 111 of the control unit 11. Step S11 is an example of a terminal ID acquisition step of the present disclosure.

Next, in step S12, the control unit 11 starts to acquire the position information of the user terminal 3. Specifically, the control unit 11 acquires position information of a user terminal 3 corresponding to the terminal ID, by using a communication function such as the GPS or beacon. The control unit 11 registers the acquired position information in the terminal information D2 (see FIG. 4) in association with the terminal ID. The control unit 11 acquires the position information on a regular basis, and updates the terminal information D2. The process of step S12 is executed by the position acquisition processing unit 112 of the control unit 11. Step S12 is an example of a position acquisition step of the present disclosure.

Subsequently, in step S13, the control unit 11 acquires a use price. For example, the control unit 11 acquires, from the facility terminal 2, information of foods and drinks that the user ordered by operating the facility terminal 2, and calculates a total use price. It is noted that the control unit 11 may acquire, from the facility terminal 2, information of a use price calculated on the facility terminal 2.

Subsequently, in step S14, the control unit 11 stores the terminal ID and the use price in the storage unit 12 in association with each other. Specifically, the control unit 11 registers the terminal ID and the use price in the terminal information D2 (see FIG. 4) in association with each other. The process of step S14 is executed by the association processing unit 113 of the control unit 11. Step S14 is an example of an association step of the present disclosure.

Subsequently, in step S15, the control unit 11 determines whether or not the user (the user terminal 3) has exited the predetermined area AR. The predetermined area AR is set as, for example, the whole internal area of the restaurant SH (the area AR1) (see FIG. 2). When it is determined that the user terminal 3 has exited the predetermined area AR (S15: YES), the process moves to step S16. On the other hand, when it is determined that the user terminal 3 has not exited the predetermined area AR (S15: NO), the process returns to step S13. Upon returning to step S13, the control unit 11 acquires a use price that has been updated to reflect foods and drinks that were ordered additionally.

In step S16, the control unit 11 determines whether or not the user terminal 3 is separated from the predetermined area AR by the predetermined distance or more after exiting the predetermined area AR. When it is determined that the user terminal 3 is separated from the predetermined area AR by the predetermined distance or more after exiting the predetermined area AR (S16: YES), the process moves to step S18. It is noted that upon detecting that the user terminal 3 is separated from the predetermined area AR by the predetermined distance or more after exiting the predetermined area AR, the control unit 11 acquires the identification information (terminal ID) of the user terminal 3. On the other hand, when it is determined that the user terminal 3 is not separated from the predetermined area AR by the predetermined distance or more after exiting the predetermined area AR (S16: NO), the process moves to step S17.

In step S17, the control unit 11 determines whether or not the user terminal 3 has returned to the predetermined area AR. That is, the control unit 11 determines whether or not the user terminal 3 exited the predetermined area AR and has returned to the predetermined area AR before being separated therefrom by the predetermined distance or more. When it is determined that the user terminal 3 has returned to the predetermined area AR (S17: YES), the process moves to step S13. Upon returning to step S13, the control unit 11 acquires a use price that has been updated to reflect foods and drinks that were ordered additionally. On the other hand, when it is determined that the user terminal 3 has not returned to the predetermined area AR (S17: NO), the process moves to step S16.

In step S18, the control unit 11 executes the payment process of the use price. For example, the control unit 11 acquires a user ID and payment information (see FIG. 3) and a use price (see FIG. 4) that are associated with the terminal ID acquired in step S16, and executes the payment process of the use price. The processes of steps S15 to S18 are executed by the payment processing unit 116 of the control unit 11. The steps S15 to S18 are an example of a payment step of the present disclosure.

According to the above-described payment support system 100, when a user temporarily exits the predetermined area AR, the payment process is not executed, but is suspended. Furthermore, when the user is separated from the predetermined area AR by the predetermined distance or more after exiting the predetermined area AR, the payment process is executed. As a result, it is possible to prevent the payment process from being executed at an unintended timing for the user. In addition, it is possible to prevent the payment process from being executed a plurality of times. Accordingly, it is possible to perform the payment process efficiently and improve the convenience of the user. In addition, in the payment support system 100, since the number of times that the payment process is executed is reduced, it is possible to restrict the number of communications with the payment support apparatus 1, the facility terminal 2, the user terminal 3, and the payment company (not shown) that are performed in connection with the payment process, thereby making it possible to reduce the communication traffic and effectively use the computer resources.

The payment support process executed in the payment support apparatus 1 is not limited to the process shown in FIG. 8.

Figure 9:
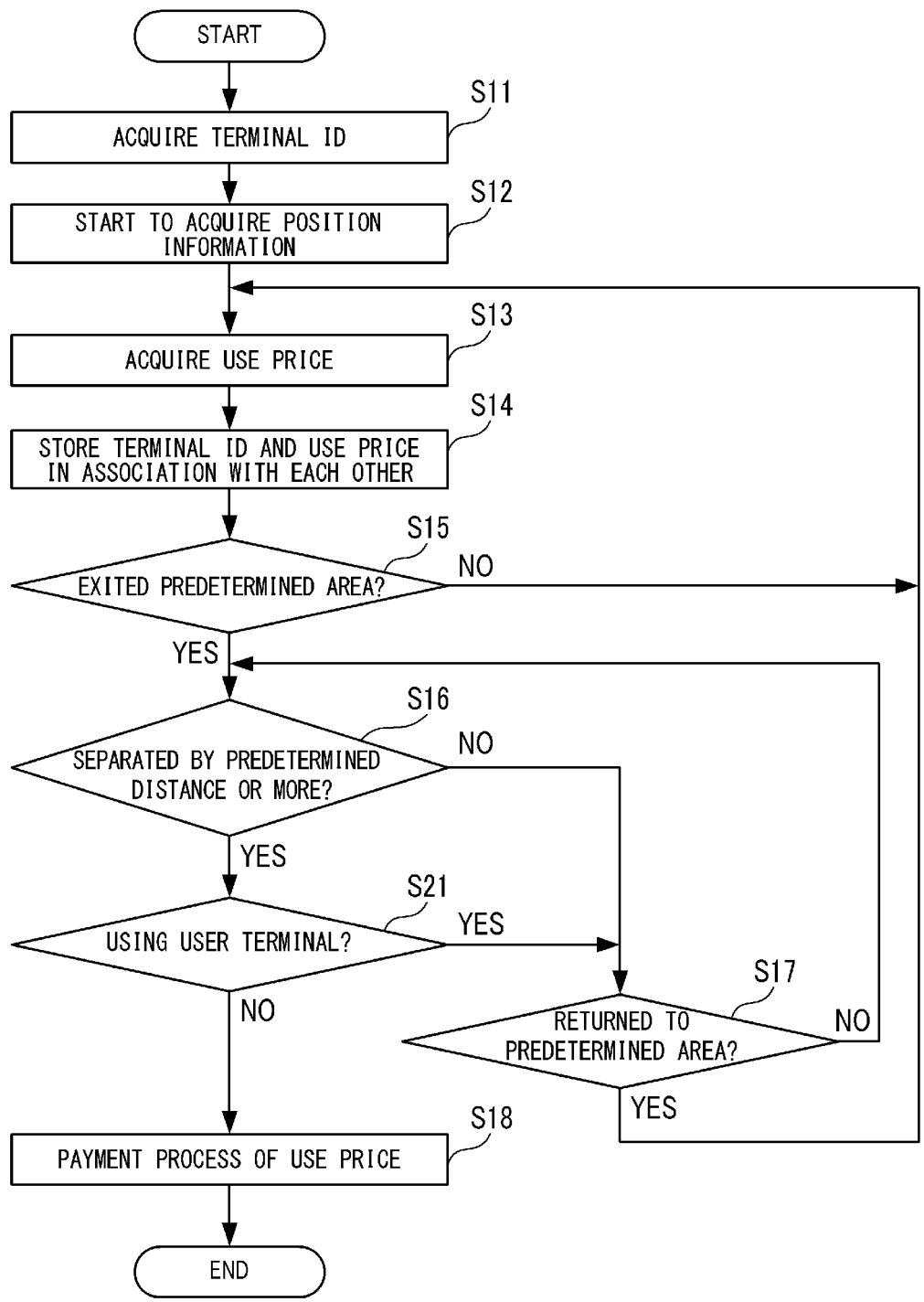
FIG. 9 is a flowchart showing another example of a procedure of the payment support process executed in the payment support system according to the embodiment of the present disclosure.

FIG. 9 is a flowchart showing another example of the payment support process. In the payment support process shown in FIG. 9, step S21 has been added to the payment support process shown in FIG. 8.

For example, as shown in FIG. 9, when it is determined in step S16 that the user terminal 3 is separated from the predetermined area AR by the predetermined distance or more after exiting the predetermined area AR (S16: YES), the process moves to step S21.

In step S21, the control unit 11 determines whether or not the user is using the user terminal 3. When it is determined that the user is using the user terminal 3 (S21: YES), the process moves to step S17. On the other hand, when it is determined that the user is not using the user terminal 3 (S21: NO), the process moves to step S18. In this way, even if the user is separated from the predetermined area AR by the predetermined distance or more after exiting the predetermined area AR (S16: YES), the payment process is not executed when it is determined that the user is using the user terminal 3 (for example, making a telephone conversation) (S21: YES) when or after the user (user terminal) exits the predetermined area AR. On the other hand, when it is determined that the user is not using the user terminal 3 (S21: NO) when or after the user (user terminal) exits the predetermined area AR, the payment process is executed (S18) on condition that the user is separated from the predetermined area AR by the predetermined distance or more after exiting the predetermined area AR. The process of step S21 is executed by the determination processing unit 114 of the control unit 11.

Figure 10:
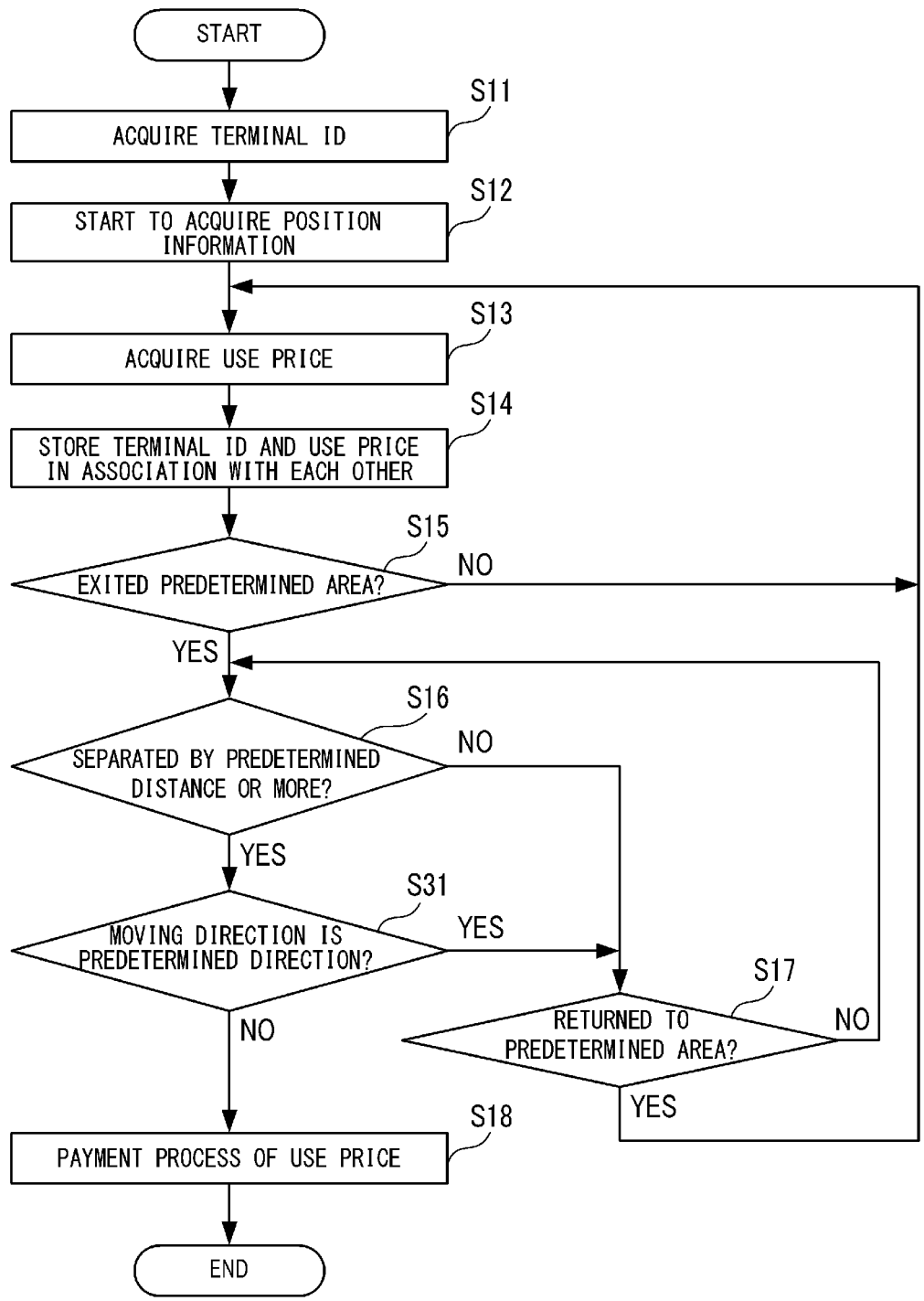
FIG. 10 is a flowchart showing another example of a procedure of the payment support process executed in the payment support system according to the embodiment of the present disclosure.

FIG. 10 is a flowchart showing another example of the payment support process. In the payment support process shown in FIG. 10, step S31 has been added to the payment support process shown in FIG. 8.

For example, as shown in FIG. 10, when it is determined in step S16 that the user terminal 3 is separated from the predetermined area AR by the predetermined distance or more after exiting the predetermined area AR (S16: YES), the process moves to step S31.

In step S31, the control unit 11 determines whether or not the moving direction of the user terminal 3 is a predetermined direction. Here, the predetermined direction is a direction toward a place that is temporarily used by a user in the restaurant SH. For example, the predetermined direction is a direction toward a toilet, a smoking space, etc. When it is determined that the moving direction of the user terminal 3 is the predetermined direction (S31: YES), the process moves to step S17. On the other hand, when it is determined that the moving direction of the user terminal 3 is not the predetermined direction (S31: NO), the process moves to step S18. In this way, even if the user is separated from the predetermined area AR by the predetermined distance or more after exiting the predetermined area AR (S16: YES), the payment process is not executed when it is determined that the user (user terminal) is moving in the predetermined direction (S31: YES). On the other hand, when it is determined that the user (user terminal) is moving in a direction (for example, toward the entrance/exit) that is different from the predetermined direction (S31: NO), the payment process is executed (S18) on condition that the user is separated from the predetermined area AR by the predetermined distance or more after exiting the predetermined area AR. The process of step S31 is executed by the moving direction acquisition processing unit 115 and the payment processing unit 116 of the control unit 11.

The payment support system of the present disclosure may have the following embodiment. As another embodiment, the payment support system 100 may execute the payment process of the use price when the user terminal 3 is separated from the predetermined area AR by the predetermined distance or more after exiting the predetermined area AR, and a predetermined time has elapsed since the user terminal 3 started to be separated from the predetermined area AR by the predetermined distance or more after exiting the predetermined area. In other words, the payment support system 100 does not execute the payment process of the use price unless the predetermined time elapses since the user terminal 3 started to be separated from the predetermined area AR by the predetermined distance or more after exiting the predetermined area, even if the user terminal 3 is separated from the predetermined area AR by the predetermined distance or more after exiting the predetermined area AR. The predetermined time is set to a time period such that if a user leaves his/her seat for the time period, the user is determined to be temporarily leaving. For example, the predetermined time is set to 30 minutes.

Figure 11:
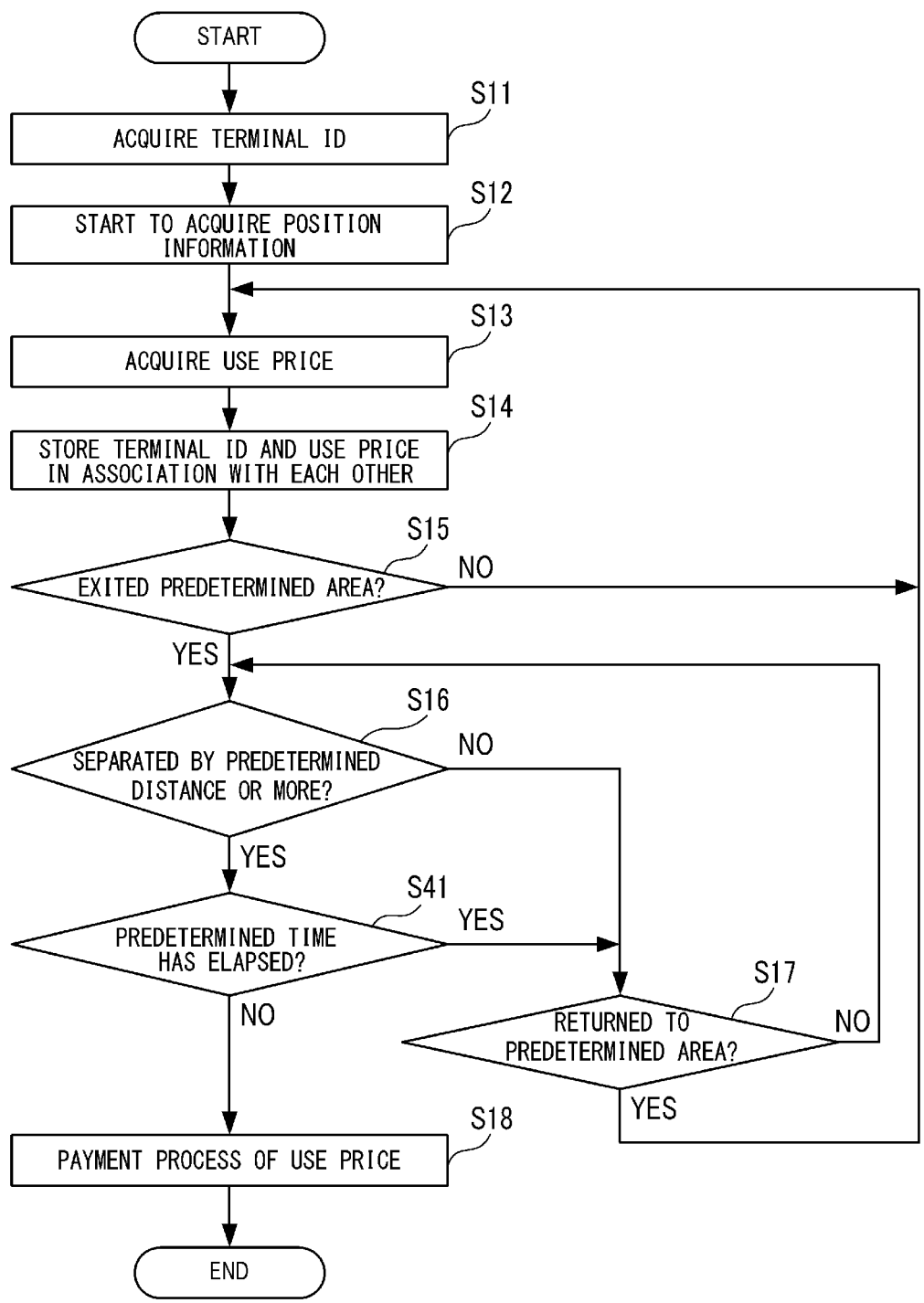
FIG. 11 is a flowchart showing another example of a procedure of the payment support process executed in the payment support system according to the embodiment of the present disclosure.

FIG. 11 is a flowchart showing another example of the payment support process. In the payment support process shown in FIG. 11, step S41 has been added to the payment support process shown in FIG. 8.

For example, as shown in FIG. 11, when it is determined in step S16 that the user terminal 3 is separated from the predetermined area AR by the predetermined distance or more after exiting the predetermined area AR (S16: YES), the process moves to step S41.

In step S41, the control unit 11 determines whether or not the predetermined time has elapsed since the user terminal 3 started to be separated from the predetermined area AR by the predetermined distance or more. When it is determined that the predetermined time has elapsed since the user terminal 3 started to be separated from the predetermined area AR by the predetermined distance or more (S41: YES), the process moves to step S18. On the other hand, when it is determined that the predetermined time has not elapsed since the user terminal 3 started to be separated from the predetermined area AR by the predetermined distance or more (S41: NO), the process moves to step S17.

For example, if the user terminal 3E receives a phone call while the user E is eating a served food at the table T7, the user E stops eating and temporarily exits (leaves) the area AR1 (the inside of the restaurant). Here, it is supposed that the user E is separated from the area AR1 by the predetermined distance (L0) or more. The control unit 11 records the time at which the user E got separated from the area AR1 by the predetermined distance (L0) or more, and starts to measure the time. When the user E finishes the telephone conversation and returns to the inside of the restaurant before the predetermined time (for example, 30 minutes) elapses since the recorded time, the control unit 11 ends measuring the time. In this case, since the predetermined time has not elapsed since the user terminal 3 started to be separated from the predetermined area AR by the predetermined distance (L0) or more, the control unit 11 does not execute but suspends the payment process of the use price for the foods and drinks ordered so far. Subsequently, if the user E returns to table T7 and orders additional foods and/or drinks, the control unit 11 acquires information of the ordered foods and drinks from the facility terminal 2, and updates the use price. Thereafter, when the user E finishes the meal, exits (leaves) the area AR1 (the inside of the restaurant), and the predetermined time (for example, 30 minutes) has elapsed since the user terminal 3 started to be separated from the predetermined area AR by the predetermined distance (L0) or more, the control unit 11 executes the payment process of the updated use price.

It is noted that as another embodiment, the control unit 11 may be configured to execute the payment process of the use price when a predetermined time has elapsed since the user terminal 3 exited the predetermined area AR even if the user terminal 3 is not separated from the predetermined area AR by the predetermined distance or more after exiting the predetermined area AR.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A payment support system comprising:
one or more processors including:
terminal ID acquisition processing circuitry configured to acquire identification information of a user terminal of a user who entered a facility;
position acquisition processing circuitry configured to acquire position information of the user terminal;
association processing circuitry configured to store the identification information acquired by the terminal ID acquisition processing circuitry and a use price of the facility of the user in a storage unit in association with each other;
payment processing circuitry configured to execute a payment process of the use price when the user terminal is separated from a predetermined area of the facility by a predetermined distance or more after exiting the predetermined area; and
moving direction acquisition processing circuitry configured to acquire a moving direction of the user terminal, wherein
the predetermined area is a specific area within the facility, and
the payment processing circuitry does not execute the payment process when the user terminal is separated from the predetermined area by the predetermined distance or more after exiting the predetermined area, and the user terminal has moved in a predetermined direction.

2. The payment support system according to claim 1, wherein
the payment processing circuitry does not execute the payment process when the user terminal is not separated from the predetermined area by the predetermined distance or more after exiting the predetermined area, and executes the payment process when the user terminal is separated from the predetermined area by the predetermined distance or more after exiting the predetermined area.

3. The payment support system according to claim 1, wherein the one or more processors further include:
determination processing circuitry configured to determine whether or not the user terminal is being used by the user, wherein
the payment processing circuitry does not execute the payment process when the user terminal is separated from the predetermined area by the predetermined distance or more after exiting the predetermined area, and the user terminal is being used.

4. The payment support system according to claim 3, wherein
the determination processing circuitry determines:
whether or not the user is having a conversation on the user terminal,
whether or not the user is working on an e-mail on the user terminal, or
whether or not the user is performing a web search on the user terminal.

5. The payment support system according to claim 1, wherein
the moving direction acquisition processing circuity acquires, based on the position information of the user terminal, a direction in which the user moves after leaving a table that is used by the user.

6. The payment support system according to claim 1, wherein
the payment processing circuity executes the payment process when the user terminal is separated from the predetermined area by the predetermined distance or more after exiting the predetermined area, and a predetermined time has elapsed since the user terminal started to be separated from the predetermined area by the predetermined distance or more after exiting the predetermined area.

7. The payment support system according to claim 1, wherein the one or more processors further include:

notification processing circuitry configured to transmit, to the user terminal, an announcement message indicating that the payment process is to be executed, when the user terminal has exited the predetermined area, and transmit, to the user terminal, a completion message indicating that the payment process has been completed, when the payment process has been completed.

8. The payment support system according to claim 7, wherein
the notification processing circuitry transmits a first announcement message when the user terminal is separated from the predetermined area by a first specific distance or more after exiting the predetermined area, and transmits a second announcement message when the user terminal is separated from the predetermined area by a second specific distance or more after exiting the predetermined area.

9. The payment support system according to claim 8, wherein
the first announcement message indicates the use price, and the second announcement message indicates that the payment process of the use price is to be executed.

10. A payment support method executable by one or more processors, the payment support method comprising:
- a terminal ID acquisition step of acquiring identification information of a user terminal of a user who entered a facility;
- a position acquisition step of acquiring position information of the user terminal;
- an association step of storing the identification information acquired in the terminal ID acquisition step and a use price of the facility of the user in a storage unit in association with each other;
- a payment step of executing a payment process of the use price when the user terminal is separated from a predetermined area of the facility by a predetermined distance or more after exiting the predetermined area; and
- a moving direction acquisition processing step configured to acquire a moving direction of the user terminal, wherein
the predetermined area is a specific area within the facility, and
the payment processing step does not execute the payment process when the user terminal is separated from the predetermined area by the predetermined distance or more after exiting the predetermined area, and the user terminal has moved in a predetermined direction.

11. A non-transitory computer-readable recording medium on which is recorded a payment support program for causing one or more processors to execute:
- a terminal ID acquisition step of acquiring identification information of a user terminal of a user who entered a facility;
- a position acquisition step of acquiring position information of the user terminal;
- an association step of storing the identification information acquired in the terminal ID acquisition step and a use price of the facility of the user in a storage unit in association with each other;
- a payment step of executing a payment process of the use price when the user terminal is separated from a predetermined area of the facility by a predetermined distance or more after exiting the predetermined area; and
- a moving direction acquisition processing step configured to acquire a moving direction of the user terminal, wherein
the predetermined area is a specific area within the facility, and
the payment processing step does not execute the payment process when the user terminal is separated from the predetermined area by the predetermined distance or more after exiting the predetermined area, and the user terminal has moved in a predetermined direction.

* * * * *